Dec. 30, 1952                    M. H. L. SÉDILLE ET AL                    2,623,352
         METHOD AND MEANS FOR ADJUSTING THE OUTLET
         CROSS-SECTION OF THE EXHAUST NOZZLE OF
         A REACTION JET PROPELLER FOR AIRCRAFT
         AND THE LIKE HIGH-SPEED VEHICLES
Filed May 9, 1946                                           3 Sheets-Sheet 2

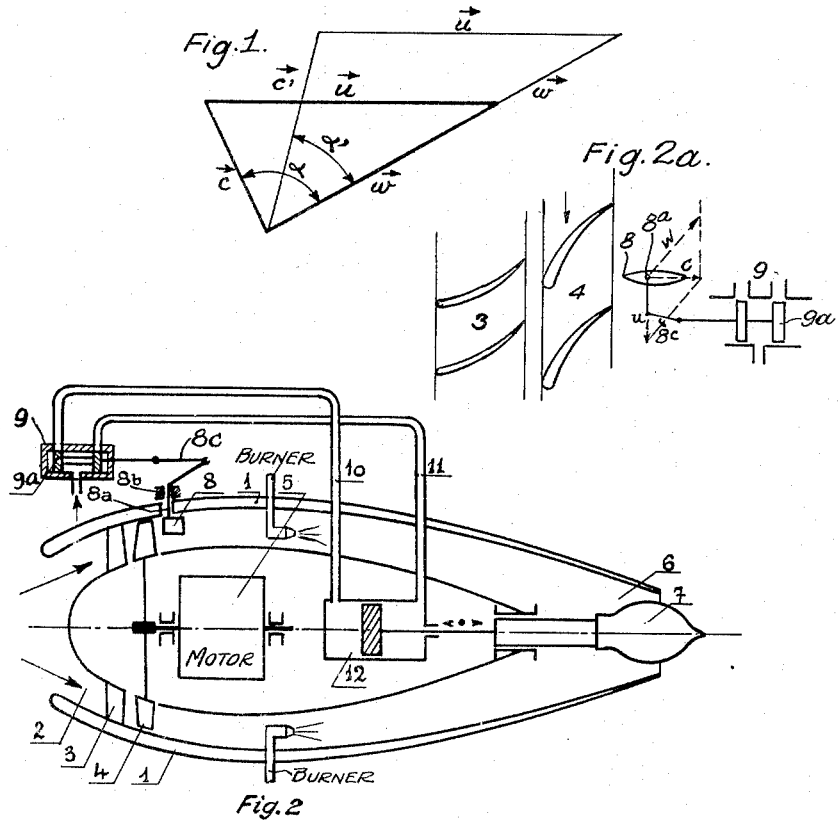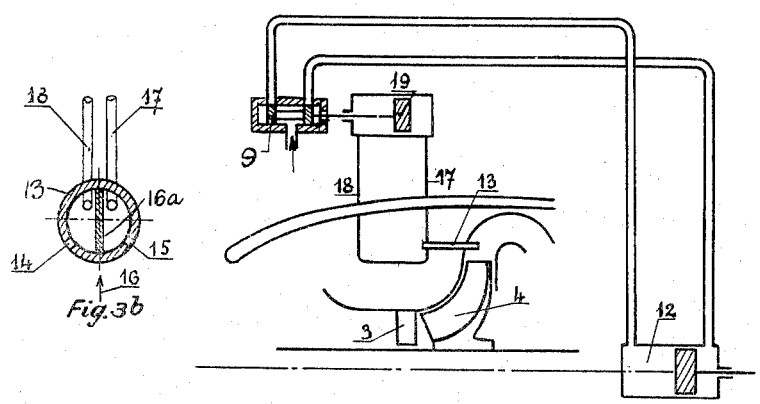

INVENTORS
M. H. L. Sédille and
R. J. Imbert

By Watson, Cole, Grindle & Watson
ATTYS

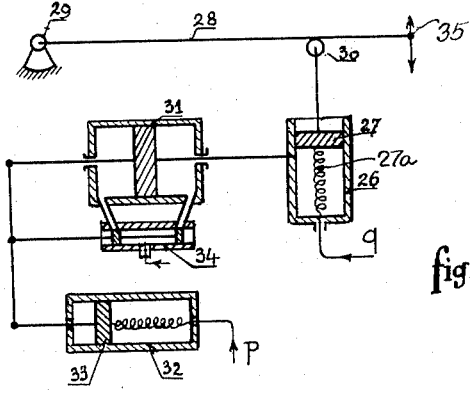
fig. 8_
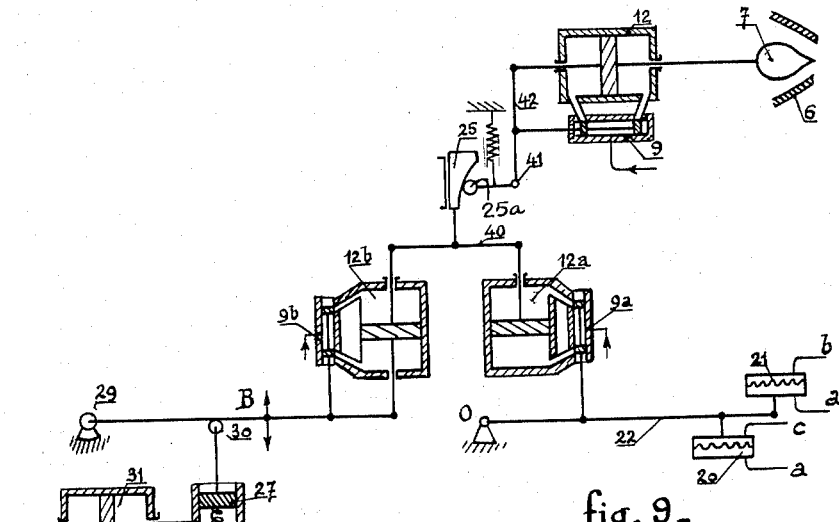
fig. 9_
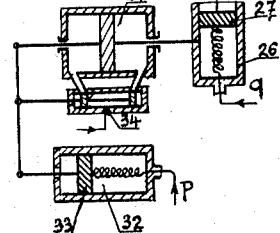
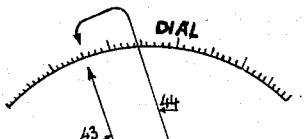
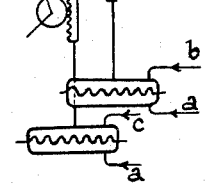
fig. 10_

Patented Dec. 30, 1952

2,623,352

UNITED STATES PATENT OFFICE 2,623,352

METHOD AND MEANS FOR ADJUSTING THE OUTLET CROSS SECTION OF THE EXHAUST NOZZLE OF A REACTION JET PROPELLER FOR AIRCRAFT AND THE LIKE HIGH-SPEED VEHICLES

Marcel Henri Louis Sédille and Roger Jean Imbert, Paris, France, assignors to Societe Rateau (Societe Anonyme), a company of France, and Rene Anxionnaz, both of Paris, France, jointly Application May 9, 1946, Serial No. 668,570
In France May 23, 1945

4 Claims. (Cl. 60—35.6)

Reaction jet propellers for high speed vehicles and in particular for aircrafts comprise generally at the entrance of the stream of air a divergent member provided for the prior compression of the air, a centrifugal or axial compressor with one or more stages, an engine of any type for the drive of the compressor, eventually one or more complementary thermic sources and lastly a reaction nozzle inside which the gases expand, while forming the propelling jet. Calculation and experience show that the cross-sectional area of the reaction nozzle should vary as a function of the altitude of operation and of the speed of the vehicle, of the speed of rotation of the engine driving the compressor and lastly of the amount of fuel burned for heating the air.

These factors vary independently one with reference to the others, but it is necessary however that at each moment the cross-sectional area of the reaction nozzle may be such that the compressor operates with its optimum efficiency, in order to ensure the best efficiency of propulsion and to avoid an instable operation inside the pumping zone of the compressor which has an extremely detrimental action for the proper operation of the system.

It is moreover known that the efficiency of the compressor is the highest when the ratio between the compressor head generated and the square of the output Q of the compressor is a constant or else when the speed triangles remain similar to one another whatever may be the speed of rotation of the compressor.

The present invention covers methods and means of adjustment providing for the hand operated or automatic control of the operation of the air compressor at optimum opening whatever may be the temporary variations of the four above disclosed variables. It consists chiefly in modifying the cross-sectional area of the reaction nozzle as a function of the said ratio $$\frac{H}{Q^2}$$

and in such manner that the said ratio remains constant. In a first embodiment of the invention, the cross-sectional area of the nozzle is controlled in dependence of the direction of the absolute speed of air at its outlet from one of the movable bladings of the compressor and in a second embodiment this area is controlled in dependence of the ratio between two suitably chosen differences in pressure.

The following description given out with reference to accompanying drawings shown by way of example and by no means in a limitative sense will make the manner of carrying the invention into effect more readily understood. In said drawings:

Fig. 1 illustrates the speed diagram at the outlet of the movable wheel of a compressor stage.

Fig. 2 illustrates diagrammatically an embodiment of the means adjusting the cross-sectional area of the reaction jet nozzle through the action of an auxiliary motor submitted to the displacement of a movable blade located inside the stream of air at the outlet of the compressor wheel.

Fig. 2a illustrates a plan view of the movable blade of Fig. 2 with relation to the speed diagram of Fig. 1.

Fig. 3a illustrates as a modification a method for detecting the changes in the operation of the compressor by a directional sounding pipe.

Fig. 3b is a cross-section of said sounding pipe at an increased scale.

Figs. 7 and 8 show an arrangement for the rough adjustment of the closing means of the reaction jet nozzle while Fig. 9 illustrates an adjusting device combining Figs. 7, 8 and 5 so that a preliminary rough adjustment is followed by a finishing adjustment.

Figure 4:
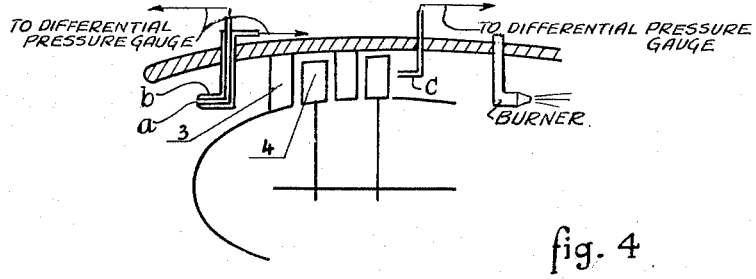
Fig. 4 shows pressure measuring means according to another manner of detecting the changes in the operation of the compressor and Fig. 5 illustrates an embodiment of an adjusting device controlling the cross-sectional area of the reaction nozzle as a function of the pressures detected by the device according to Fig. 6.

Lastly Fig. 10 is a perspective diagrammatic view of another embodiment adapted to hand adjustment of the reaction jet nozzle.

Considering a suitable stage of a centrifugal or axial compressor, it is possible to draw the diagram of the speed of the air at the outlet from the movable wheel, the absolute output speed of the fluid being equal to the vector sum of the relative speed and of the tangential speed of the wheel.

In Fig. 1,

corresponds to the relative speed of the air with reference to the movable wheel,

to the tangential speed of the wheel and

to the absolute speed. It is known that the triangle of speeds thus obtained remains similar to itself when the stage of compression considered operates with a constant opening, i. e. with a ratio $$\frac{H}{Q^2}$$

remaining constant. If the triangle considered corresponds to the operation at the maximum efficiency and if variations occur in the conditions of operation, in the case for instance of an increase in output, all the remaining conditions keeping the same, the relative speed of the air at the outlet of the wheel increases in proportion with the output and becomes $$\vec{w'},$$

while the tangential speed $$\vec{u}$$

of the wheel will remain unchanged so that the absolute speed $$\vec{c}$$

will assume a new value $$\vec{c'},$$

and the angle $a$ formed by the speed $$\vec{c}$$

with $$\vec{w}$$

for instance will assume a new value $a'$. In accordance with the invention it is possible to make use of the variation of the angle $a$ for detecting the variations in the operation of the compression stage with reference to the optimum operation at constant opening whatever may be the individual variations of each of the four variables already defined.

According to a first embodiment of the invention, this angular variation may be made use of for operating the control device of the cross-sectional area of the reaction jet nozzle.

Figs. 2 and 2a illustrate diagrammatically by way of example such an embodiment.

The propelling means comprise: an outer casing 1 with an air intake nozzle 2 at the front end thereof, an air compressor with stationary blades 3 and a movable wheel 4, a motor 5 driving the said wheel and lastly, at the rear end, a reaction jet nozzle 6. The variation in the cross-sectional area of the nozzle is obtained by displacing axially the closing means 7. In accordance with the invention, there is arranged inside the stream of air delivered by the movable wheel 4 of the compressor a windvane 8 or like member sensitive to the direction of the absolute speed of the air delivered and the displacement of which acts on the position of the closing member 7. According to Fig. 2 the pivoting movement of the windvane 8 and of its rod 8a inside guide 8b, acts by a link 8c on the sliding member 9a of a distributor 9. The displacements of the sliding member 9a provide for the admission of any driving fluid through the one or the other of the two pipes 10—11 to either operative face of the auxiliary motor 12 which controls the displacements of the closing means 7.

Of course, the member which is sensitive to the variation in the direction of the stream of air delivered by the wheel may be of any other different type. It may comprise for instance a stationary blade located in the direction of the air at normal rate of operation of the compressor and carrying static pressure measuring means arranged on both faces or a manometric box having two lateral openings located symmetrically about the median plane thereof, the latter being parallel to the direction of air at normal flow for the desired operative conditions. Figs. 3a and 3b show by way of example, an embodiment of this kind. Fig. 3b is a transversal cross-section of the sounding pipe 13 comprising two openings 14—15 arranged symmetrically to either side of a diametral partition 16a, the plane of which is parallel to the direction 16 of the stream of air under normal desired operation of the compressor. The difference in the pressures given out respectively by the two openings 14 and 15 is zero under such conditions, but this difference may assume positive or negative values with variations in the direction of the stream. According to Fig. 3a, the differential pressures thus obtained, act, through the agency of pipes 17 and 18, on a piston 19, the displacements of which alter the position of the slide valve 9 which controls the auxiliary motor 12. This motor drives the closing means 7, in the manner shown in Fig. 2.

The differential pressure exerted by the directional sounding pipe or the thrust exerted by a windvane located in the stream of air may be applied directly to the partial closing means of the reaction jet nozzle or indirectly through the agency of transmissions or energy amplifying means such as relays, mechanical or electrical auxiliary motors or electrical detecting means such as piezo-electric crystals associated with one or more stages of electric amplification.

According to a second embodiment of the invention, it is possible to use for adjusting the cross-sectional area of the reaction jet nozzle the indication of manometers connected with suitably selected pressure intake means. It is possible to use for instance the differential pressure of a sounding line of the total intake type $a$ (as seen in Fig. 4) associated with a static intake $b$ located in front of the compressor so as to obtain thus the dynamic head $$\frac{\pi V^2}{2g}$$

$\pi$ being the specific weight of the air taking part in the cycle and V the speed of flow. The difference $Pc-Pa$ in the pressures read respectively on a total pressure intake $c$ located at the outlet on the compressor and of the total pressure intake means $a$ located ahead of the compressor is equal to the difference in pressure produced by the compressor. The ratio $r$ between these two differential pressures is given out with an undefined constant by the relation:

$$r = \frac{Pc - Pa}{Pa - Pb}$$

But $$Pa - Pb = \frac{\pi V^2}{2g}$$

as indicated above, $\pi$ being the specific weight of the air.

It follows therefrom that $$r = \frac{(Pc - Pa) 2g}{\pi V^2}$$

On another hand the head H generated by the compressor as a fluid column height is given by the formula $$H = \frac{Pc - Pa}{\pi} + \frac{V^2}{2g}$$

$$\frac{Pc - Pa}{\pi} = H - \frac{V^2}{2g}$$

Consequently $$r = \left(H - \frac{V^2}{2g}\right) \cdot \frac{2g}{V^2}$$

that is to say $$r = 2g \frac{H}{V^2} - 1$$

but the output Q (by volume) of the compressor is given by the formula $Q = AV$ $$V = \frac{Q}{A}$$

wherein A is the cross-sectional area of the air passage.

It follows therefrom that $$r = 2gA^2 \frac{H}{Q^2} - 1$$

Figure 5:
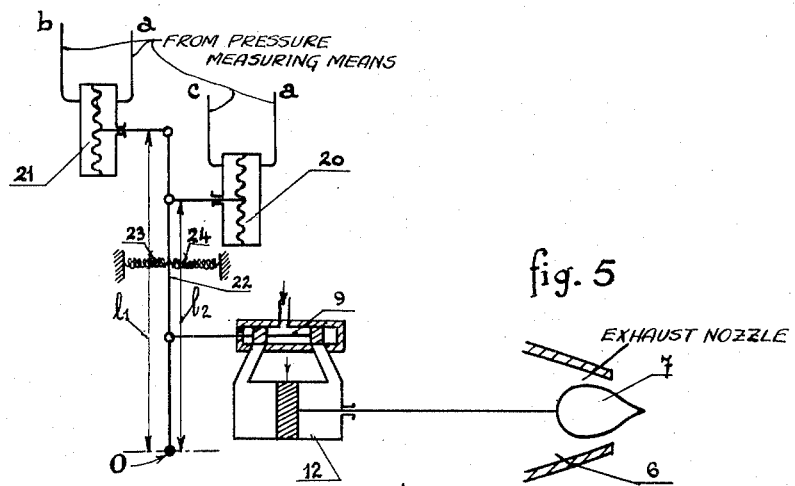

As $g$ and $A$ are constant, it appears that if the ratio $r$ is kept constant, the ratio $$\frac{H}{Q^2}$$

remains also constant. As the object of the invention is to maintain constant the ratio $$\frac{H}{Q^2}$$

it appears that it is sufficient to keep constant the ratio $$r = \frac{Pc - Pa}{Pa - Pb}$$

through a suitable adjustment whatever may be the conditions of operation of the propelling means. Fig. 5 shows diagrammatically by way of example and by no means in a limitative sense an embodiment of such an arrangement. A first diaphragm capsule 20 is submitted to the pressures $a$ and $c$ and provides the numerator of the ratio $r$ while a second capsule 21 enclosing a diaphragm submitted to the pressures $a$ and $b$ provides the denominator of $r$. The two capsules 20 and 21 act simultaneously on a lever 22 through lever arms $l_1$ and $l_2$. The balance between the torques around the stationary pivot O of the lever is expressed by the relation:

$$(Pa - Pb) S_1 l_1 - (Pc - Pa) S_2 l_2 = 0$$

in which the cross-sectional area of the diaphragms are designated by $S_1$ and $S_2$, or else:

$$\frac{Pc - Pa}{Pa - Pb} = \frac{S_1 l_1}{S_2 l_2}$$

Two springs 23 and 24 are mounted in opposition to one another so as to act in opposite directions on the lever 22, and to define a predetermined position for the lever 22 when the torques balance one another.

The variations of the ratio $r$ cause a rotation of the lever 22 which acts for instance on the valve 9 which adjusts in its turn the admission of oil under pressure on to the piston of the auxiliary motor 12 controlling the position of the closing means 7 for the reaction jet nozzle 6. The adjustment system illustrated is diagrammatic. It may be executed according to the known rules applied in technical adjustments.

Instead of measuring the pressures at $abc$ by means of special sounding lines, it is possible to measure (Fig. 6) the total pressure $Pa^1$ ahead of the blades of the compressor and the static pressure $Pc^1$ at the outlet of the compressor, provided the ratio $r$ is defined by the difference $Pc' - Pb'$ at the numerator and $Pc' - Pa'$ at the denominator.

Figure 6:
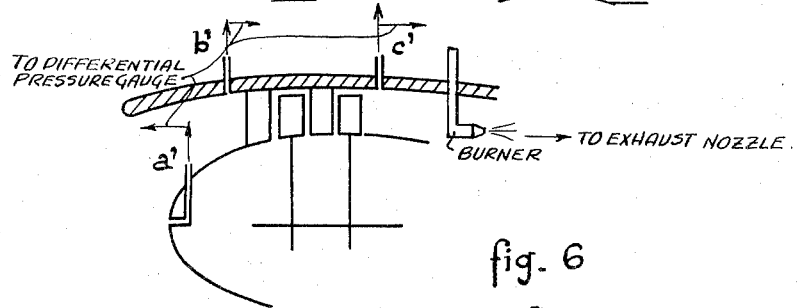
Fig. 6 illustrates a modification of such pressure measuring device.

Propellers of the kind referred to are often provided with auxiliary burners arranged just before the reaction jet nozzle as shown in 7a in Fig. 6; said burners being or not in operation according to the propelling thrust required. When fuel is injected into said auxiliary burners, in order to increase the temperature of the gases before the reaction nozzle and consequenty the propelling thrust, the cross-sectional area of the said nozzle must be increased. With the regulating device above described this adjustment of the nozzles takes place only when the output of the compressor has varied by reason of the pressure variation of the gases in its delivering circuit.

Consequently there may be a certain delay which leads to the possibility for the compressor of working eventually inside the so-called pumping zone. This may even produce in spite of the heating a reduction in the propelling power which would be in contradiction with the object sought for. It may therefore be necessary to proceed with a preliminary regulation, i. e., to open the nozzle when the auxiliary burners are ignited at least in a substantially approximative manner, the adjustment proper being then required only for finishing the adjustment which has been thus roughly initiated. The manner of executing this two stage adjustment will be described hereinbelow with reference to the case of the use of pressure measuring pipes for detecting the variation in the output of the compressor. However this description is by no means given in a limitative sense and is also applicable with suitable modifications in the case of an adjustment executed with the use of a movable windvane as in Fig. 2 or of a pipe with two holes as in Figs. 3a and 3b.

Calculation shows that whatever may be the conditions of operation of the propelling means, if $S$ designates the free cross-sectional area of the reaction nozzle, $\Delta S$ its variation, $q$ the amount of fuel injected into the burners and $p$ the pressure of air as it enters the compressor, the following proportionality relation is practically exact.

$$\frac{q}{p} \text{ proportional to } \frac{\Delta S}{S}$$

Consequently for a rough adjustment, the relative increase in cross-section $$\frac{\Delta S}{S}$$

of the reaction jet nozzle should be proportional to $q$ and inversely proportional to $p$; the corresponding adjustment may be executed in different manners and in particular in conformity with the following modus operandi.

Figure 7:
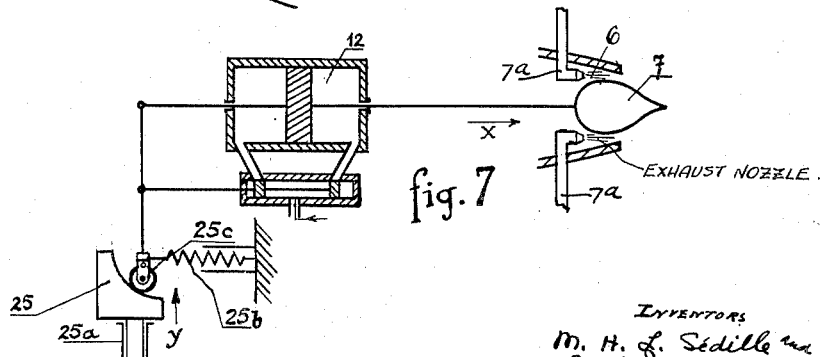

Whatever may be the law of variation of the cross-sectional area S of the outlet of the reaction jet nozzle with reference to the displacement $x$ of the member 12 controlling the closing member 7 (Fig. 7), it is always possible to find a cam 25 of suitable shape such that a translational or rotational infinitesimal movement $dy$ of the latter proportional to $$\frac{q}{p}$$

produces a displacement of the rod controlling the closing member which leads to a variation in cross-section proportional to $$\frac{\Delta S}{S}$$

i. e., to the logarithm of S. In Fig. 7, the cam is adapted to move inside a guiding member 25a and its displacements y therein are vertical. A pressure spring 25b provides for urging the roller 25c against the cam.

In order to provide for the action of p and q, it is possible for instance to use the arrangement of Fig. 8. In this embodiment the piston 27 of a first cylinder 26 is displaced proportionally to q and this displacement is transmitted to lever 28 pivoting around a stationary point 29. The cylinder 26 may be connected, for instance, to the fuel pipe feeding the burners 7a so that the piston 27 is submitted to the pressure of the fuel before the burners. As the said pressure is proportional to $q^2$, the force of the spring 27a, which acts on the piston 27 in antagonism with the pressure of the fuel, must be proportional to the square of the length of said spring, in order that the displacement of piston 27 may be proportional to q. Arrangements of this kind are well known for men skilled in the art. The rod of piston 27 bears against the lever through the agency of a roller 30 and the point of application of said roller may be shifted along the lever 28 by an auxiliary motor 31 the piston of which carries the cylinder 26. The displacements of the piston of the auxiliary motor 31 and consequently those of the point of application on the roller 30 against the lever 28, i. e., the length of the lever arm 29—30 are made dependent on p due to the action of a second cylinder 32, the piston 33 of which controls the distributor 34 of the auxiliary motor 31.

The angular displacement of the lever 28 or else that of one of its points 35 is thus proportional as desired to $$\frac{q}{p}$$

If the displacements of 35 are transmitted to the cam 25 shown on Fig. 7, it is possible to obtain an immediate variation of the outlet cross-sectional area of the reaction nozzle providing for a preliminary or rough adjustment responding immediately to each variation in the heating by the burners.

It is finally possible to combine such a rough adjustment device with a finishing adjustment device which latter acts on the cross-sectional area of the jet nozzle according to the opening of the compressor. Fig. 9 shows by way of example an embodiment of this type combining the arrangements of Figs. 5, 7 and 8. The lever 22 of Fig. 5 controls the distributor 9a of an auxiliary motor 12a and similarly the lever 28 described with reference to Fig. 8, now, in the case of Fig. 9 controls the slide valve 9b of an auxiliary motor 12b. The displacements of the pistons of the two auxiliary motors 12a and 12b are finally composed by a swing-bar 40 acting on the cam 25. The roller 25a is displaced along the outline of this cam and causes a rotation around the pivot 41 of the lever 42. This produces a displacement of the distributor 9 which controls the auxiliary motor 12 acting on the closing member 7 of the reaction jet nozzle.

This forms a comparatively intricate arrangement and it may be easier in certain cases to replace the automatic adjustment above described by a manual adjustment performed by the pilot on the control members in conformity with the indications of the instrument board. A such embodiment comprises (Fig. 10) on the same dial two hands 43, 44 giving out respectively the value of $(Pc-Pa)$ and $(Pa-Pb)$ and operated by manometric capsules submitted to this pressure. Through a suitable selection of the size of the transmission members between the manometric capsules and the hands 43, 44 it is possible to obtain a coefficient of proportionality equal to 1; in other words the displacements of the hands 43, 44 should be the same on the dial in order that the proportionality corresponding to the operation of the compressor in conformity with the law $$\frac{H}{Q^2} = \text{constant}$$

It is therefore sufficient after opening a valve or cock for admitting fuel to the burners for instance, to act manually directly or indirectly on the position of the member closing the reaction jet nozzle until the two indicating hands give out the same indication on the dial.

What we claim is:

1. In a reaction jet propeller including an air compressor, at least one burner for injecting fuel into the air flow discharged by said compressor, and a reaction jet nozzle provided with a movable member adapted to increase the passage cross-section of said nozzle when moved in one direction and to decrease said passage cross-section when moved in the opposite direction, a device for automatically adjusting the position of said member, comprising, in combination, means for detecting any variation of the ratio $H/Q^2$, H being the compression head generated by said compressor and Q the output thereof, and means depending on said detecting means for displacing said member in such a direction that said variation tends to decrease, whereby said ratio is kept substantially constant.

2. A device according to claim 1, in which the detecting means includes means for measuring the total pressure and the static pressure of air at the inlet of the compressor, and means for measuring the total pressure of air at the outlet of said compressor.

3. A device according to claim 1, further comprising means for measuring the rate of fuel consumption of the burner, said latter means controlling, in conjunction with the detecting means, the means for displacing the passage cross-section adjusting member.

4. A device according to claim 1, further comprising means for measuring the ratio $q/p$, q being the rate of fuel consumption of the burner and p the pressure of air at the inlet of the compressor, said latter means controlling, in conjunction with the detecting means, the means for displacing the passage cross-section adjusting member.

MARCEL HENRI LOUIS SÉDILLE.
ROGER JEAN IMBERT.

REFERENCES CITED

The following references are of record in the file of this patent:

UNITED STATES PATENTS

| Number | Name | Date |
| --- | --- | --- |
| 2,280,835 | Lysholm | Apr. 28, 1942 |
| 2,390,043 | Borden | Dec. 4, 1945 |
| 2,411,895 | Poole | Dec. 3, 1946 |
| 2,457,595 | Orr, Jr. | Dec. 28, 1948 |